(12) United States Patent
Eipper et al.

(10) Patent No.: US 8,410,227 B2
(45) Date of Patent: *Apr. 2, 2013

(54) FLUID POLYESTER MOULDING MASSES

(75) Inventors: Andreas Eipper, Ludwigshafen (DE); Bernd Bruchmann, Freinsheim (DE); Dietrich Scherzer, Neustadt (DE); Jean-Francois Stumbe, Strasbourg (FR); Carsten Weiβ, Ludwigshafen (DE); Freddy Gruber, Offenbach (DE)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/482,496

(22) Filed: May 29, 2012

(65) Prior Publication Data

US 2012/0232212 A1  Sep. 13, 2012

Related U.S. Application Data

(63) Continuation of application No. 10/587,997, filed as application No. PCT/EP2005/001014 on Feb. 2, 2005, now abandoned.

(30) Foreign Application Priority Data

Feb. 4, 2004 (DE) .......... 10 2004 005 652

(51) Int. Cl.
*C08F 283/00* (2006.01)

(52) U.S. Cl. .......... 525/500; 525/439; 525/67; 524/409; 524/100; 524/126; 524/133

(58) Field of Classification Search .......... 525/500
See application file for complete search history.

(56) References Cited

U.S. PATENT DOCUMENTS

| | | |
|---|---|---|
| 3,305,605 A | 2/1967 | Hostettler et al. |
| 3,479,314 A | 11/1969 | Williams |
| 3,491,048 A | 1/1970 | Sargent |
| 4,002,581 A | 1/1977 | Dolce |
| 4,164,114 A | 8/1979 | Yabuki et al. |
| 4,239,677 A | 12/1980 | Dieck |
| 4,351,916 A | 9/1982 | Kohan |
| 4,396,742 A | 8/1983 | Binsack et al. |
| 4,771,109 A | 9/1988 | Eichenauer et al. |
| 4,873,289 A | 10/1989 | Lindner et al. |
| 4,882,381 A | 11/1989 | Wittman et al. |
| 5,010,135 A | 4/1991 | Eckel et al. |
| 5,136,014 A | 8/1992 | Figuly |
| 5,144,005 A | 9/1992 | Sextro et al. |
| 5,157,076 A | 10/1992 | Greenlee et al. |
| 5,250,595 A | 10/1993 | Miyashita et al. |
| 5,314,949 A | 5/1994 | Kozakura et al. |
| 5,348,699 A | 9/1994 | Meyer et al. |
| 5,399,620 A | 3/1995 | Niessner et al. |
| 5,480,944 A | 1/1996 | Aharoni |
| 5,496,887 A | 3/1996 | Braune |
| 5,608,030 A | 3/1997 | Hoffmockel et al. |
| 5,621,031 A | 4/1997 | Leimann et al. |
| 5,712,336 A | 1/1998 | Gareiss et al. |
| 5,844,059 A | 12/1998 | Yamamoto et al. |
| 5,998,565 A | 12/1999 | de Brabander-van den Berg et al. |
| 6,037,444 A | 3/2000 | Rannard et al. |
| 6,087,449 A | 7/2000 | Tiefensee et al. |
| 6,225,404 B1 | 5/2001 | Sorensen et al. |
| 6,232,435 B1 | 5/2001 | Heitz et al. |
| 6,252,025 B1 | 6/2001 | Wang et al. |
| 6,262,185 B1 | 7/2001 | Heitz et al. |
| 6,300,424 B1 | 10/2001 | Frechet et al. |
| 6,497,959 B1 | 12/2002 | Mhetar |
| 6,528,612 B1 | 3/2003 | Brenner et al. |
| 6,541,599 B1 | 4/2003 | Wang |
| 6,894,112 B1 | 5/2005 | Weber et al. |
| 7,081,509 B2 | 7/2006 | Wagner et al. |
| 2002/0120076 A1 | 8/2002 | Schueler et al. |
| 2002/0161113 A1 | 10/2002 | Dvornic et al. |
| 2003/0018104 A1 | 1/2003 | Mours et al. |
| 2003/0069370 A1 | 4/2003 | Dvornic et al. |
| 2003/0082384 A1 | 5/2003 | Mhetar |
| 2003/0171503 A1 | 9/2003 | Adedeji |
| 2004/0138388 A1 | 7/2004 | Pecorini et al. |
| 2004/0192857 A1 | 9/2004 | Borer et al. |
| 2004/0220374 A1 | 11/2004 | Heuer et al. |
| 2005/0025091 A1 | 2/2005 | Patel et al. |
| 2005/0054812 A1 | 3/2005 | Wagner et al. |
| 2005/0124779 A1 | 6/2005 | Shelby et al. |
| 2005/0165177 A1 | 7/2005 | Wagner et al. |
| 2006/0142442 A1 | 6/2006 | Scherzer et al. |
| 2008/0015303 A1 | 1/2008 | Eibeck et al. |

FOREIGN PATENT DOCUMENTS

| | | |
|---|---|---|
| BE | 702357 | 2/1968 |
| BE | 720658 | 11/1969 |
| CA | 2019904 | 1/1991 |
| CA | 733567 | 5/1996 |
| CA | 2256343 | 12/1997 |
| CA | 2554037 | 8/2005 |
| CA | 2554038 | 8/2005 |

(Continued)

OTHER PUBLICATIONS

K. Pochner, et al., Treatment of Polymers for subsequent metallization using intense UV radiation or plasma at atmospheric pressure, 1997, 372-377, Surface and Coatings Technology 97.

(Continued)

*Primary Examiner* — Doris Lee

(74) *Attorney, Agent, or Firm* — Novak Druce Connolly Bove + Quigg LLP

(57) ABSTRACT

Thermoplastic molding compositions comprising

A) from 10 to 99.99% by weight of at least one thermoplastic polyester,

B) from 0.01 to 50% by weight of a hyperbranched polycarbonate having an OH number of from 1 to 600 mg KOH/g of polycarbonate (to DIN 53240, Part 2), C) from 0 to 60% by weight of other additives, where the total of the percentages by weight of components A) to C) is 100%.

14 Claims, No Drawings

FOREIGN PATENT DOCUMENTS

| | | |
|---|---|---|
| DE | 55319 | 2/1891 |
| DE | 55320 | 2/1891 |
| DE | 222868 | 6/1910 |
| DE | 3725576 | 2/1989 |
| DE | 3800603 | 7/1989 |
| DE | 4307392 | 4/1994 |
| DE | 4328004 | 2/1995 |
| DE | 19953950 | 5/2001 |
| DE | 10132928 | 1/2003 |
| DE | 10136911 | 2/2003 |
| DE | 10147712 | 4/2003 |
| DE | 10163163 | 7/2003 |
| DE | 10240817 | 3/2004 |
| DE | 10251294 | 5/2004 |
| DE | 10304341 | 8/2004 |
| DE | 102004005652 | 8/2005 |
| DE | 102004005657 | 8/2005 |
| DE | 102004057867 | 6/2006 |
| DE | 102005012482 | 9/2006 |
| EP | 0050265 | 4/1982 |
| EP | 0047529 | 6/1985 |
| EP | 0208187 | 1/1987 |
| EP | 0235690 | 9/1987 |
| EP | 0319290 | 6/1989 |
| EP | 0410301 | 1/1991 |
| EP | 0484737 | 5/1992 |
| EP | 0545184 | 6/1993 |
| EP | 0629644 | 12/1994 |
| EP | 0682057 | 11/1995 |
| EP | 0736571 | 10/1996 |
| EP | 1099727 | 5/2001 |
| EP | 1207172 | 5/2002 |
| EP | 1344794 | 9/2003 |
| EP | 1424360 | 6/2004 |
| EP | 1424362 | 6/2004 |
| EP | 07114384.6 | 8/2007 |
| EP | 07121118.9 | 11/2007 |
| FR | 2833603 | 6/2003 |
| FR | 2833604 | 6/2003 |
| FR | 2856693 | 12/2004 |
| GB | 1458561 | 12/1976 |
| GB | 1558308 | 12/1979 |
| GB | 2324797 | 11/1998 |
| JP | 002379462 | 10/1990 |
| JP | 4175366 | 6/1992 |
| JP | 2006/100758 | 9/1992 |
| JP | 06157880 | 11/1992 |
| JP | 08269306 | 3/1995 |
| JP | 09157503 | 12/1995 |
| JP | 11060663 | 3/1999 |
| JP | 11255853 | 9/1999 |
| JP | 11279245 | 10/1999 |
| SU | 519449 | 6/1976 |
| WO | WO-96/11962 | 4/1996 |
| WO | WO-97/05705 | 2/1997 |
| WO | WO-97/08241 | 3/1997 |
| WO | WO-97/45474 | 12/1997 |
| WO | WO-98/50453 | 11/1998 |
| WO | WO0058385 | 10/2000 |
| WO | WO-02/32982 | 4/2002 |
| WO | WO-03/004546 | 1/2003 |
| WO | WO-03/064502 | 8/2003 |
| WO | WO-03/093343 | 11/2003 |
| WO | WO-2004/087785 | 10/2004 |
| WO | WO-2004/111126 | 12/2004 |
| WO | WO-2005/012380 | 2/2005 |
| WO | WO-2005/075563 | 8/2005 |
| WO | WO-2005/075565 | 8/2005 |
| WO | WO-2006/018127 | 2/2006 |
| WO | WO-2006/018128 | 2/2006 |
| WO | WO-2006/018179 | 2/2006 |
| WO | WO-2006/040066 | 4/2006 |
| WO | WO-2006/040101 | 4/2006 |
| WO | WO-2006/042673 | 4/2006 |
| WO | WO-2006/048247 | 5/2006 |
| WO | WO-2006/082201 | 8/2006 |
| WO | WO-2006/134115 | 12/2006 |
| WO | WO-2007/009929 | 1/2007 |
| WO | WO-2007/009930 | 1/2007 |
| WO | WO-2008/074687 | 6/2008 |

OTHER PUBLICATIONS

A. Weber et al., Metallization of Polymers Using Plasma-Enhanced Chemical Vapor Deposited Titanium Nitride as Interlayer, Mar. 1997, 1131-1135, Journal of The Electrochemical Society, vol. 14, No. 3.

H. Horn, et al., Excimer laser pretreatment and metallization of polymers, 1999, 270-284, Nuclear Instruments and Methods in Physics Research B151.

Massa, et al., "Novel blends of Hyperbranched Polyesters and Linear polymers", *Macromolecules* (1995), pp. 3214-3220, vol. 28, No. 9.

Gorda, et al., "Star Shaped Condensation Polymers: Synthesis, Characterization, and Blend Properties", Journal of Applied Polymer Science (1993), pp. 1977-1983, vol. 50.

Sunder, et al., "Synthesis and Thermal Behaviour of Esterfied Allpghatic Hyperbranched Polyether Polyols", *Macromolecules* (2000), pp. 1330-1337, vol. 33.

Lin, et al., "Polymerization of $A_2$ with $B_3$ Monomers: A Facile Approach to Hyperbranched Poly(aryl ester)s", *Macromolecules*, No. 36, 2003, pp. 9809-9816.

Luman, et al., "The Convergent Synthesis of Poly(glycerol-succinic acid) Dendritic macromolecules", Chem. Eur. J., No. 9, 2003, pp. 5618-5626.

XP-002379462, Toray Ind., Inc.

International Preliminary Report on Patentability for International Application No. PCT/EP2006/063167, issued Jan. 16, 2008.

International Preliminary Report on Patentability for International Application No. PCT/EP2006/063167, issued Dec. 17, 2007.

International Preliminary Report on Patentability for International Application No. PCT/EP2006/064182, issued Jan. 22, 2008.

International Preliminary Report on Patentability for International Application No. PCT/EP2006/064182, issued Feb. 5, 2008.

International Preliminary Report on Patentability for International Application No. PCT/EP2006/064180, issued Feb. 5, 2008.

International Preliminary Report on Patentability for International Application No. PCT/EP2006/064180, issued Jan. 22, 2008.

International Preliminary Report on Patentability for International Application No. PCT/EP2005/011704, issued May 22, 2007.

International Preliminary Report on Patentability for International Application No. PCT/EP2005/010854.

International Preliminary Report on Patentability for International Application No. PCT/EP2006/042673.

International Preliminary Report on Patentability for International Application No. PCT/EP2005/001015.

International Preliminary Report on Patentability for International Application No. PCT/EP2005/001015, issued May 6, 2006.

International Preliminary Report on Patentability for International Application No. PCT/EP2006/050590, issued Aug. 14, 2007.

International Preliminary Report on Patentability for International Application No. PCT/EP2006/050590, issued Aug. 7, 2007.

International Preliminary Report on Patentability for International Application No. PCT/EP2005/010762, issued Apr. 24, 2007.

International Preliminary Report on Patentability for International Application No. PCT/EP2005/008339.

Becker/Braun, Kunststoffhandbuch, vol. 3/1. Polycarbonate, Polyacetale, Polyester. Celluloseester, Carl-Hanser-Verlag, Munchen, 1992, pp. 118-119.

S. Rannard, et al., "A Highly Selective, One-Pot Multiple-Addition Convergent Synthesis of Polycarbonate Dendrimers", J. Am. Chem. Soc., 2000, vol. 122, pp. 11729-11730.

D. Bolton, et al., "Synthesis and Characterization of Hyperbranched Polycarbonates", Macromolecules, 1997, vol. 30, pp. 1890-1896.

J. Jang, et al., "Crystallization Behavior of Poly(ethylene terephthalate) Blended with Hyperbranched Polymers: The Effect of Terminal Groups and Composition of Hyperbranched Polymers", Macromolecules, 2000, vol. 33, pp. 1864-1870.

P. Carr, et al., "Dielectric and mechanical characterization of aryl ester dendrimer/PET blends", Polymer, vol. 37, No. 12, 1996, pp. 2395-2401.

International Preliminary Report on Patentability for International Application No. PCT/EP2005/010854, issued Nov. 6, 2006.

International Preliminary Report on Patentability for International Application No. PCT/EP2005/001015, issued May 8, 2006.

International Preliminary Report on Patentability for International Application No. PCT/EP2005/008339, issued Aug. 11, 2006.

FLUID POLYESTER MOULDING MASSES

CROSS REFERENCE TO RELATED APPLICATIONS

This application is a Continuation of co-pending application Ser. No. 10/587,997 filed on Aug. 1, 2006, and for which priority is claimed under 35 U.S.C. §120, which is a National Phase filing under 35 U.S.C. §371 of PCT/EP2005/001014 filed on Feb. 2, 2005; and this application claims priority to Application No. 102004005652.8 filed in Germany on Feb. 4, 2004 under 35 U.S.C. §119; the entire contents of all are hereby incorporated by reference The invention relates to thermoplastic molding compositions comprising
A) from 10 to 99.99% by weight of at least one thermoplastic polyester,
B) from 0.01 to 50% by weight of a highly branched or hyperbranched polycarbonate having an OH number of from 1 to 600 mg KOH/g of polycarbonate (to DIN 53240, Part 2),
C) from 0 to 60% by weight of other additives,
where the total of the percentages by weight of components A) to C) is 100%.

The invention further relates to the use of the inventive molding compositions for producing fibers, films, or moldings of any type, and also to the moldings thus obtainable.

Polycarbonates are usually obtained from the reaction of alcohols with phosgene, or from the transesterification of alcohols or phenols with dialkyl or diaryl carbonates. Industrial importance is attached to aromatic polycarbonates, which are prepared from bisphenols, for example, while the part played by aliphatic polycarbonates has hitherto been subordinate in terms of market volume. In this connection, see also Becker/Braun, Kunststoff-Handbuch [Plastics Handbook], vol. 3/1, Polycarbonate, Polyacetale, Polyester, Celluloseester [Polycarbonates, Polyacetals, Polyesters, Cellulose Esters], Carl-Hanser-Verlag, Munich 1992, pp. 118-119.

The structure of the aliphatic polycarbonates described is generally linear or else has a very small degree of branching. For example, U.S. Pat. No. 3,305,605 describes the use of solid linear polycarbonates with a molecular weight above 15 000 dalton as plasticizers for polyvinyl polymers.

To improve flowability, low-molecular-weight additives are usually added to thermoplastics. However, the action of these additives is subject to severe restriction, because, for example, the fall-off in mechanical properties becomes unacceptable when the amount added of the additive increases.

Dendritic polymers with a perfectly symmetrical structure, referred to as dendrimers, can be prepared starting from a central molecule by controlled stepwise linking, two or more at a time, of difunctional or higher polyfunctional monomers to each monomer already bonded. With each linking step there is exponential growth in the number of monomer end groups (and hence of linkages), and polymers are obtained which have treelike structures, ideally spherical, whose branches each comprise exactly the same number of monomer units. On the basis of this perfect structure the polymer properties are advantageous; for example, a surprisingly low viscosity is observed, and also a high reactivity, owing to the high number of functional groups on the surface of the sphere. The preparation, however, is complicated by the fact that at each linking step it is necessary to introduce protective groups and remove them again, and purifying operations are necessary, which is why dendrimers are normally prepared only on a laboratory scale.

With industrial processes it is possible, however, to prepare highly branched or hyperbranched polymers. These polymers, in addition to perfect dendritic structures, also feature linear polymer chains and unequal polymer branches, although this does not substantially impair the polymer properties as compared with those of the perfect dendrimers. Hyperbranched polymers can be prepared by two synthesis routes, known as $AB_2$ and $A_x+B_y$. Here, $A_x$ and $B_y$ are different monomers and the indices x and y are the number of functional groups present in A and B respectively, in other words the functionality of A and B. In the case of the $AB_2$ route a trifunctional monomer having one reactive group A and two reactive groups B is converted into a highly branched or hyperbranched polymer. In the case of the $A_x+B_y$ synthesis, depicted using the example of the $A_2+B_3$ synthesis, a difunctional monomer $A_2$ is reacted with a trifunctional monomer $B_3$. The initial product is a 1:1 adduct of A and B having on average one functional group A and two functional groups B, and this adduct can then likewise react to give a highly branched or hyperbranched polymer.

Highly functional polycarbonates of defined structure have been disclosed only recently.

S. P. Rannard and N. J. Davis, J. Am. Chem. Soc. 2000, 122, 11729, describe the preparation of dendrimeric polycarbonates with perfect branching, via reaction of carbonylbisimidazole as phosgene analog with bishydroxyethylamino-2-propanol. Syntheses giving perfect dendrimers are multistage syntheses and therefore expensive, and not very suitable for conversion to industrial scale.

D. H. Bolton and K. L. Wooley, Macromolecules 1997, 30, 1890, describe the preparation of high-molecular-weight, very rigid hyperbranched aromatic polycarbonates via reaction of 1,1,1-tris(4'-hydroxyphenyl)ethane with carbonylbisimidazole.

Hyperbranched polycarbonates can also be prepared according to WO 98/50453. In the process described in that specification, triols are again reacted with carbonylbisimidazole. Initially imidazolides are produced, and these then undergo a further intermolecular reaction to give the polycarbonates. In the method mentioned, the polycarbonates are produced in the form of colorless or pale yellow rubber-like products.

The syntheses mentioned giving highly branched or hyperbranched polycarbonates have the following disadvantages:
a) the hyperbranched products are either high-melting or else rubber-like, and this markedly restricts subsequent processibility.
b) imidazole liberated during the reaction has to be removed from the reaction mixture by a complicated process.
c) the reaction products always contain terminal imidazolide groups. These groups are labile and have to be converted by way of a subsequent step into hydroxy groups, for example.
d) carbonyldiimidazole is a comparatively expensive chemical which greatly increases raw material costs.

The present invention was therefore based on the object of providing thermoplastic polyester molding compositions which have good flowability together with good mechanical properties.

Surprisingly, the highly branched or hyperbranched polycarbonates obtainable by means of a low-cost simple industrial process are suitable as significant flow improvers in thermoplastics. Furthermore, their structures can easily be adapted to the requirements of the application within thermoplastics, and their defined structure can give them a combination of advantageous properties, such as high functionality, high reactivity, low viscosity, and good solubility.

Accordingly, the molding compositions defined at the outset have been found. Preferred embodiments are given in the subclaims.

The inventive molding compositions comprise, as component (A), from 10 to 99.99% by weight, preferably from 30 to 99.5% by weight, and in particular from 30 to 99.3% by weight, of at least one thermoplastic polyester.

Use is generally made of polyesters A) based on aromatic dicarboxylic acids and on an aliphatic or aromatic dihydroxy compound.

A first group of preferred polyesters is that of polyalkylene terephthalates, in particular those having from 2 to 10 carbon atoms in the alcohol moiety.

Polyalkylene terephthalates of this type are known per se and are described in the literature. Their main chain contains an aromatic ring which derives from the aromatic dicarboxylic acid. There may also be substitution in the aromatic ring, e.g. by halogen, such as chlorine or bromine, or by $C_1$-$C_4$-alkyl, such as methyl, ethyl, iso- or n-propyl, or n-, iso- or tert-butyl.

These polyalkylene terephthalates may be prepared by reacting aromatic dicarboxylic acids, or their esters or other ester-forming derivatives, with aliphatic dihydroxy compounds in a manner known per se.

Preferred dicarboxylic acids are 2,6-naphthalenedicarboxylic acid, terephthalic acid and isophthalic acid, and mixtures of these. Up to 30 mol %, preferably not more than 10 mol %, of the aromatic dicarboxylic acids may be replaced by aliphatic or cycloaliphatic dicarboxylic acids, such as adipic acid, azelaic acid, sebacic acid, dodecanedioic acids and cyclohexanedicarboxylic acids.

Preferred aliphatic dihydroxy compounds are diols having from 2 to 6 carbon atoms, in particular 1,2-ethanediol, 1,3-propanediol, 1,4-butanediol, 1,6-hexanediol, 1,4-hexanediol, 1,4-cyclohexanediol, 1,4-cyclohexanedimethanol and neopentyl glycol, and mixtures of these.

Particularly preferred polyesters (A) are polyalkylene terephthalates derived from alkanediols having from 2 to 6 carbon atoms. Among these, particular preference is given to polyethylene terephthalate, polypropylene terephthalate and polybutylene terephthalate, and mixtures of these. Preference is also given to PET and/or PBT which comprise, as other monomer units, up to 1% by weight, preferably up to 0.75% by weight, of 1,6-hexanediol and/or 2-methyl-1,5-pentanediol.

The viscosity number of the polyesters (A) is generally in the range from 50 to 220, preferably from 80 to 160 (measured in 0.5% strength by weight solution in a phenol/o-dichlorobenzene mixture in a weight ratio of 1:1 at 25° C.) in accordance with ISO 1628.

Particular preference is given to polyesters whose carboxyl end group content is up to 100 mval/kg of polyester, preferably up to 50 mval/kg of polyester and in particular up to 40 mval/kg of polyester. Polyesters of this type may be prepared, for example, by the process of DE-A 44 01 055. The carboxyl end group content is usually determined by titration methods (e.g. potentiometry).

Particularly preferred molding compositions comprise, as component A), a mixture of polyesters other than PBT, for example polyethylene terephthalate (PET). The proportion of the polyethylene terephthalate, for example, in the mixture is preferably up to 50% by weight, in particular from 10 to 35% by weight, based on 100% by weight of A).

It is also advantageous to use recycled PET materials (also termed scrap PET) if appropriate mixed with polyalkylene terephthalates, such as PBT.

Recycled materials are generally:
1) those known as post-industrial recycled materials: these are production wastes during polycondensation or during processing, e.g. sprues from injection molding, start-up material from injection molding or extrusion, or edge trims from extruded sheets or films.
2) post-consumer recycled materials: these are plastic items which are collected and treated after utilization by the end consumer. Blow-molded PET bottles for mineral water, soft drinks and juices are easily the predominant items in terms of quantity.

Both types of recycled material may be used either as ground material or in the form of pellets. In the latter case, the crude recycled materials are separated and purified and then melted and pelletized using an extruder. This usually facilitates handling and free flow, and metering for further steps in processing.

The recycled materials used may either be pelletized or in the form of regrind. The edge length should not be more than 10 mm, preferably less than 8 mm.

Because polyesters undergo hydrolytic cleavage during processing (due to traces of moisture) it is advisable to predry the recycled material. The residual moisture content after drying is preferably <0.2%, in particular <0.05%.

Another group to be mentioned is that of fully aromatic polyesters deriving from aromatic dicarboxylic acids and aromatic dihydroxy compounds.

Suitable aromatic dicarboxylic acids are the compounds previously mentioned for the polyalkylene terephthalates. The mixtures preferably used are made from 5 to 100 mol % of isophthalic acid and from 0 to 95 mol % of terephthalic acid, in particular from about 50 to about 80% of terephthalic acid and from 20 to about 50% of isophthalic acid.

The aromatic dihydroxy compounds preferably have the formula

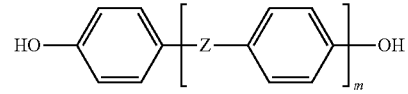

where Z is alkylene or cycloalkylene having up to 8 carbon atoms, arylene having up to 12 carbon atoms, carbonyl, sulfonyl, oxygen or sulfur, or a chemical bond, and m is from 0 to 2. The phenylene groups of the compounds may also have substitution by $C_1$-$C_6$-alkyl or alkoxy and fluorine, chlorine or bromine.

Examples of parent compounds for these compounds are dihydroxybiphenyl,
di(hydroxyphenyl)alkane,
di(hydroxyphenyl)cycloalkane,
di(hydroxyphenyl)sulfide,
di(hydroxyphenyl)ether,
di(hydroxyphenyl)ketone,
di(hydroxyphenyl)sulfoxide,
α,α'-di(hydroxyphenyl)dialkylbenzene,
di(hydroxyphenyl)sulfone, di(hydroxybenzoyl)benzene,
resorcinol, and
hydroquinone, and also the ring-alkylated and ring-halogenated derivatives of these.

Among these, preference is given to
4,4'-dihydroxybiphenyl,
2,4-di(4'-hydroxyphenyl)-2-methylbutane,
α,α'-di(4-hydroxyphenyl)-p-diisopropylbenzene,
2,2-di(3'-methyl-4'-hydroxyphenyl)propane, and
2,2-di(3'-chloro-4'-hydroxyphenyl)propane, and in particular to
2,2-di(4'-hydroxyphenyl)propane
2,2-di(3',5-dichlorodihydroxyphenyl)propane,
1,1-di(4'-hydroxyphenyl)cyclohexane,
3,4'-dihydroxybenzophenone,
4,4'-dihydroxydiphenyl sulfone and
2,2-di(3',5'-dimethyl-4'-hydroxyphenyl)propane
and mixtures of these.

It is, of course, also possible to use mixtures of polyalkylene terephthalates and fully aromatic polyesters. These generally comprise from 20 to 98% by weight of the polyalkylene terephthalate and from 2 to 80% by weight of the fully aromatic polyester.

It is, of course, also possible to use polyester block copolymers, such as copolyetheresters. Products of this type are known per se and are described in the literature, e.g. in US-A 3 651 014. Corresponding products are also available commercially, e.g. Hytrel® (DuPont).

According to the invention, polyesters include halogen-free polycarbonates. Examples of suitable halogen-free polycarbonates are those based on diphenols of the formula

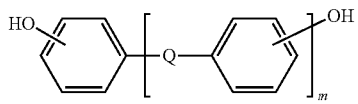

where Q is a single bond, $C_1$-$C_8$-alkylene, $C_2$-$C_3$-alkylidene, $C_3$-$C_6$-cycloalkylidene, $C_6$-$C_{12}$-arylene, or —O—, —S— or —$SO_2$—, and m is a whole number from 0 to 2.

The phenylene radicals of the diphenols may also have substituents, such as $C_1$-$C_6$-alkyl or $C_1$-$C_6$-alkoxy.

Examples of preferred diphenols of the formula are hydroquinone, resorcinol, 4,4'-dihydroxybiphenyl, 2,2-bis(4-hydroxyphenyl)propane, 2,4-bis(4-hydroxyphenyl)-2-methylbutane and 1,1-bis(4-hydroxyphenyl)cyclohexane. Particular preference is given to 2,2-bis(4-hydroxyphenyl)propane and 1,1-bis(4-hydroxyphenyl)cyclohexane, and also to 1,1-bis(4-hydroxyphenyl)-3,3,5-trimethylcyclohexane.

Either homopolycarbonates or copolycarbonates are suitable as component A, and preference is given to the copolycarbonates of bisphenol A, as well as to bisphenol A homopolymer.

Suitable polycarbonates may be branched in a known manner, specifically by incorporating 0.05 to 2.0 mol %, based on the total of the biphenols used, of at least trifunctional compounds, for example those having three or more phenolic OH groups.

Polycarbonates which have proven particularly suitable have relative viscosities $n_{rel}$ of from 1.10 to 1.50, in particular from 1.25 to 1.40. This corresponds to an average molar mass $M_w$ (weight-average) of from 10 000 to 200 000 g/mol, preferably from 20 000 to 80 000 g/mol.

The diphenols of the formula are known per se or can be prepared by known processes.

The polycarbonates may, for example, be prepared by reacting the diphenols with phosgene in the interfacial process, or with phosgene in the homogeneous-phase process (known as the pyridine process), and in each case the desired molecular weight may be achieved in a known manner by using an appropriate amount of known chain terminators. (In relation to polydiorganosiloxane-containing polycarbonates see, for example, DE-A 33 34 782).

Examples of suitable chain terminators are phenol, p-tert-butylphenol, or else long-chain alkylphenols, such as 4-(1,3-tetramethylbutyl)phenol as in DE-A 28 42 005, or monoalkylphenols, or dialkylphenols with a total of from 8 to 20 carbon atoms in the alkyl substituents as in DE-A-35 06 472, such as p-nonylphenyl, 3,5-di-tert-butylphenol, p-tert-octylphenol, p-dodecylphenol, 2-(3,5-dimethylheptyl)phenol and 4-(3,5-dimethylheptyl)phenol.

For the purposes of the present invention, halogen-free polycarbonates are polycarbonates made from halogen-free biphenols, from halogen-free chain terminators and, if used, halogen-free branching agents, where the content of subordinate amounts at the ppm level of hydrolyzable chlorine, resulting, for example, from the preparation of the polycarbonates with phosgene in the interfacial process, is not regarded as meriting the term halogen-containing for the purposes of the invention. Polycarbonates of this type with contents of hydrolyzable chlorine at the ppm level are halogen-free polycarbonates for the purposes of the present invention.

Other suitable components A) which may be mentioned are amorphous polyester carbonates, where during the preparation process phosgene has been replaced by aromatic dicarboxylic acid units, such as isophthalic acid and/or terephthalic acid units. Reference may be made at this point to EP-A 711 810 for further details.

EP-A 365 916 describes other suitable copolycarbonates having cycloalkyl radicals as monomer units.

It is also possible for bisphenol A to be replaced by bisphenol TMC. Polycarbonates of this type are obtainable from Bayer with the trademark APEC HT®.

The inventive molding compositions comprise, as component B), from 0.01 to 50% by weight, preferably from 0.5 to 20% by weight, and in particular from 0.7 to 10% by weight, of a highly branched or hyperbranched polycarbonate having an OH number of from 1 to 600, preferably from 10 to 550, and in particular from 50 to 550, mg KOH/g of polycarbonate (to DIN 53240, Part 2).

For the purposes of this invention, hyperbranched polycarbonates B1) are non-crosslinked macromolecules having hydroxy groups and carbonate groups, these having both structural and molecular non-uniformity. Their structure may firstly be based on a central molecule in the same way as dendrimers, but with non-uniform chain length of the branches. Secondly, they may also have a linear structure with functional pendant groups, or else they combine the two extremes, having linear and branched molecular portions. See also P. J. Flory, J. Am. Chem. Soc. 1952, 74, 2718, and H. Frey et al., Chem. Eur. J. 2000, 6, No. 14, 2499 for the definition of dendrimeric and hyperbranched polymers.

"Hyperbranched" in the context of the present invention means that the degree of branching (DB), i.e. the average number of dendritic linkages plus the average number of end groups per molecule, is from 10 to 99.9%, preferably from 20 to 99%, particularly preferably from 20 to 95%.

"Dendrimer" in the context of the present invention means that the degree of branching is from 99.9 to 100%. See H. Frey et al., Acta Polym. 1997, 48, 30 for the definition of "degree of branching", defined as $$DB = \frac{T+Z}{T+Z+L} \times 100\%,$$

(where T is the average number of terminal monomer units, Z is the average number of branched monomer units, and L is the average number of linear monomer units in the macromolecules of the respective compounds).

Component B1) preferably has a number-average molar mass $M_n$ of from 100 to 15 000 g/mol, preferably from 200 to 12 000 g/mol, and in particular from 500 to 10 000 g/mol (GPC, PMMA standard).

The glass transition temperature Tg is in particular from −80 to +140° C., preferably from −60 to 120° C. (according to DSC, DIN 53765).

In particular, the viscosity (mPas) at 23° C. (to DIN 53019) is from 50 to 200 000, in particular from 100 to 150 000, and very particularly preferably from 200 to 100 000.

Component B1) is preferably obtainable via a process which encompasses at least the following steps:

a) reacting at least one organic carbonate (A) of the general formula RO[(CO)]$_n$OR with at least one aliphatic, aliphatic/aromatic or aromatic alcohol (B) which has at least 3 OH groups, with elimination of alcohols ROH to give one or more condensates (K), where each R, independently of the others, is a straight-chain or branched aliphatic, aromatic/aliphatic or aromatic hydrocarbon radical having from 1 to 20 carbon atoms, and where the radicals R may also be connected to one another to form a ring, and n is an integer between 1 and 5, or ab) reacting phosgene, diphosgene or triphosgene with abovementioned alcohol (B), with elimination of hydrogen chloride, and b) intermolecular reaction of the condensates (K) to give a highly functional, highly branched, or highly functional, hyperbranched polycarbonate, where the quantitative proportion of the OH groups to the carbonates in the reaction mixture is selected in such a way that the condensates (K) have an average of either one carbonate group and more than one OH group or one OH group and more than one carbonate group.

The starting material used can be phosgene, diphosgene or triphosgene, preference being given to organic carbonates.

Each of the radicals R of the organic carbonates (A) used as starting material and having the general formula RO(CO)$_n$OR is, independently of the others, a straight-chain or branched aliphatic, aromatic/aliphatic or aromatic hydrocarbon radical having from 1 to 20 carbon atoms. The two radicals R may also have bonding to one another to form a ring. The radical is preferably an aliphatic hydrocarbon radical, and particularly preferably a straight-chain or branched alkyl radical having from 1 to 5 carbon atoms, or is a substituted or unsubstituted phenyl radical.

Use is made in particular of simple carbonates of the formula RO(CO)$_n$OR; n is preferably 1 to 3, in particular 1.

By way of example, dialkyl or diaryl carbonates may be prepared from the reaction of aliphatic, araliphatic, or aromatic alcohols, preferably monoalcohols, with phosgene. They may also be prepared by way of oxidative carbonylation of the alcohols or phenols by means of CO in the presence of noble metals, oxygen, or $NO_x$. In relation to preparation methods for diaryl or dialkyl carbonates, see also "Ullmann's Encyclopedia of Industrial Chemistry", 6th edition, 2000 Electronic Release, Verlag Wiley-VCH.

Examples of suitable carbonates encompass aliphatic, aromatic/aliphatic or aromatic carbonates, such as ethylene carbonate, propylene 1,2- or 1,3-carbonate, diphenyl carbonate, ditolyl carbonate, dixylyl carbonate, dinaphthyl carbonate, ethyl phenyl carbonate, dibenzyl carbonate, dimethyl carbonate, diethyl carbonate, dipropyl carbonate, dibutyl carbonate, diisobutyl carbonate, dipentyl carbonate, dihexyl carbonate, dicyclohexyl carbonate, diheptyl carbonate, dioctyl carbonate, didecyl carbonate, or didodecyl carbonate.

Examples of carbonates in which n is greater than 1 comprise dialkyl dicarbonates, such as di(t-butyl)dicarbonate, or dialkyl tricarbonates such as di(t-butyl tricarbonate).

It is preferable to use aliphatic carbonates, in particular those in which the radicals encompass from 1 to 5 carbon atoms, e.g. dimethyl carbonate, diethyl carbonate, dipropyl carbonate, dibutyl carbonate, or diisobutyl carbonate.

The organic carbonates are reacted with at least one aliphatic alcohol (B) which has at least 3 OH groups, or with mixtures of two or more different alcohols.

Examples of compounds having at least three OH groups encompass glycerol, trimethylolmethane, trimethylolethane, trimethylolpropane, 1,2,4-butanetriol, tris(hydroxymethyl)amine, tris(hydroxyethyl)amine, tris(hydroxypropyl)amine, pentaerythritol, diglycerol, triglycerol, polyglycerol, bis(trimethylolpropane)tris(hydroxy-methyl)isocyanurate, tris(hydroxyethyl)isocyanurate, phloroglucinol, trihydroxytoluene, trihydroxydimethylbenzene, phloroglucides, hexahydroxybenzene, 1,3,5-benzene-trimethanol, 1,1,1-tris(4'-hydroxyphenyl)methane, 1,1,1-tris(4'-hydroxyphenyl)ethane, bis(trimethylolpropane) or sugars, e.g. glucose, trifunctional or higher-functionality polyetherols based on trifunctional or higher-functionality alcohols and ethylene oxide, propylene oxide, or butylene oxide, or polyesterols. Particular preference is given here to glycerol, trimethylolethane, trimethylolpropane, 1,2,4-butanetriol, pentaerythritol, and also their polyetherols based on ethylene oxide or propylene oxide.

These polyhydric alcohols may also be used in a mixture with dihydric alcohols (B'), with the proviso that the average total OH functionality of all of the alcohols used is greater than 2. Examples of suitable compounds having two OH groups encompass ethylene glycol, diethylene glycol, triethylene glycol, 1,2- and 1,3-propanediol, dipropylene glycol, tripropylene glycol, neopentyl glycol, 1,2-, 1,3-, and 1,4-butanediol, 1,2-, 1,3-, and 1,5-pentanediol, hexanediol, cyclopentanediol, cyclohexanediol, cyclohexanedimethanol, bis(4-hydroxycyclohexyl)methane, bis(4-hydroxycyclohexyl)-ethane, 2,2-bis(4-hydroxycyclohexyl)propane, 1,1'-bis(4-hydroxyphenyl)-3,3,5-trimethylcyclohexane, resorcinol, hydroquinone, 4,4'-dihydroxyphenyl, bis(4-bis(hydroxyphenyl)sulfide, bis(4-hydroxyphenyl)sulfone, bis(hydroxymethyl)-benzene, bis(hydroxymethyl)toluene, bis(p-hydroxyphenyl)methane, bis(p-hydroxy-phenyl)ethane, 2,2-bis(p-hydroxyphenyl)propane, 1,1-bis(p-hydroxyphenyl)-cyclohexane, dihydroxybenzophenone, difunctional polyether polyols based on ethylene oxide, propylene oxide, butylene oxide or mixtures thereof, polytetrahydrofuran, polycaprolactone or polyesterols based on diols and dicarboxylic acids.

The diols serve to fine-tune the properties of the polycarbonate. If difunctional alcohols are used, the ratio of difunctional alcohols B') to the at least trifunctional alcohols (B) is set by the skilled worker in accordance with the desired properties of the polycarbonate. As a general rule, the amount of the alcohol or alcohols (B') is 0 to 50 mol %, relative to the total amount of all alcohols (B) and (B') together. Preferably the amount is 0 to 45 mol %, more preferably 0 to 35 mol %, and very preferably 0 to 30 mol %.

The reaction of phosgene, diphosgene or diphosgene with the alcohol or alcohol mixture takes place in general with elimination of hydrogen chloride; the reaction of the carbonates with the alcohol or alcohol mixture to give the inventive highly functional highly branched polycarbonate takes place with elimination of the monohydric alcohol or phenol from the carbonate molecule.

The highly functional highly branched polycarbonates formed by the inventive process have termination by hydroxy groups and/or by carbonate groups after the reaction, i.e. with no further modification. They have good solubility in various solvents, e.g. in water, alcohols, such as methanol, ethanol, butanol, alcohol/water mixtures, acetone, 2-butanone, ethyl acetate, butyl acetate, methoxypropyl acetate, methoxyethyl acetate, tetrahydrofuran, dimethylformamide, dimethylacetamide, N-methylpyrrolidone, ethylene carbonate, or propylene carbonate.

For the purposes of this invention, a highly functional polycarbonate is a product which, besides the carbonate groups which form the polymer skeleton, further has at least three, preferably at least six, more preferably at least ten, terminal or pendant functional groups. The functional groups are carbonate groups and/or OH groups. There is in principle no upper restriction on the number of the terminal or pendant functional groups, but products having a very high number of functional groups can have undesired properties, such as high viscosity or poor solubility. The highly functional polycarbonates of the present invention mostly have not more than 500 terminal or pendant functional groups, preferably not more than 100 terminal or pendent functional groups.

When preparing the highly functional polycarbonates B1), it is necessary to adjust the ratio of the compounds containing OH groups to phosgen or carbonate in such a way that the simplest resultant condensate (hereinafter termed condensate (K)) has an average of either one carbonate group or carbamoyl group and more than one OH group or one OH group and more than one carbonate group or carbamoyl group. The simplest structure of the condensate (K) made from a carbonate (A) and a di- or polyalcohol (B) here results in the arrangement $XY_n$ or $Y_nX$, where X is a carbonate group, Y is a hydroxy group, and n is generally a number from 1 to 6, preferably from 1 to 4, particularly preferably from 1 to 3. The reactive group which is the resultant single group here is generally termed "focal group" below.

By way of example, if during the preparation of the simplest condensate (K) from a carbonate and a dihydric alcohol the reaction ratio is 1:1, the average result is a molecule of XY type, illustrated by the general formula 1.

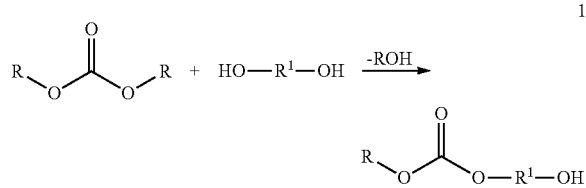

During the preparation of the condensate (K) from a carbonate and a trihydric alcohol with a reaction ratio of 1:1, the average result is a molecule of $XY_2$ type, illustrated by the general formula 2. A carbonate group is focal group here.

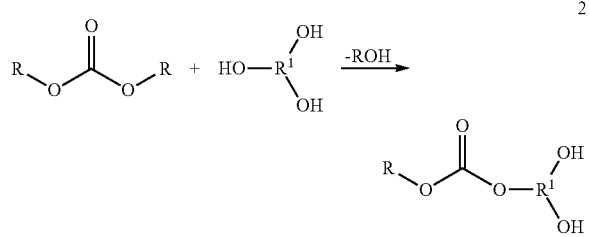

During the preparation of the condensate (K) from a carbonate and a tetrahydric alcohol, likewise with the reaction ratio 1:1, the average result is a molecule of $XY_3$ type, illustrated by the general formula 3. A carbonate group is focal group here.

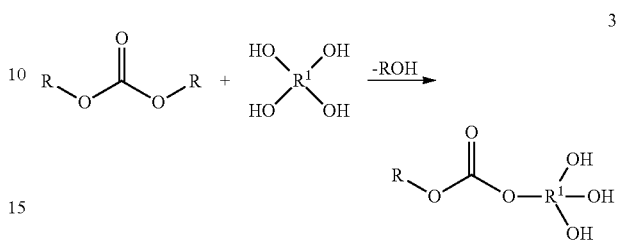

R in the formulae 1-3 has the definition given at the outset, and $R^1$ is an aliphatic or aromatic radical.

The condensates (K) may, by way of example, also be prepared from a carbonate and a trihydric alcohol, as illustrated by the general formula 4, the molar reaction ratio being 2:1. Here, the average result is a molecule of $X_2Y$ type, an OH group being focal group here. In formula 4, R and $R^1$ are as defined in formulae 1-3.

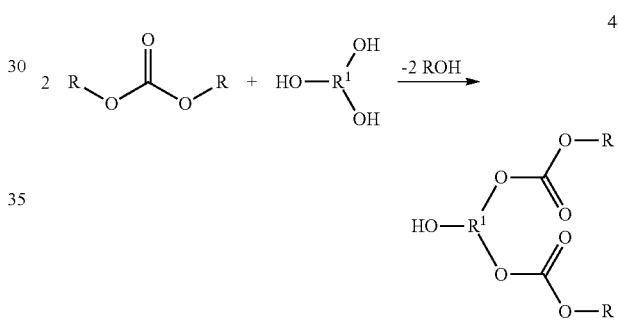

If difunctional compounds, e.g. a dicarbonate or a diol, are also added to the components, this extends the chains, as illustrated by way of example in the general formula 5. The average result is again a molecule of $XY_2$ type, a carbonate group being focal group.

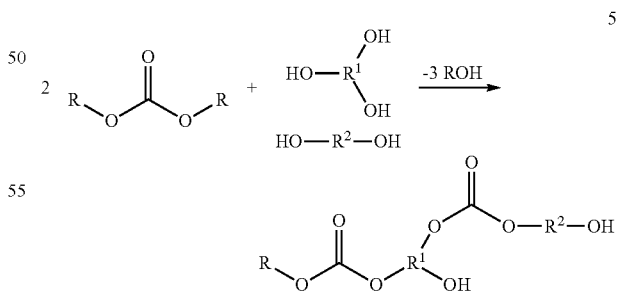

In formula 5, $R^2$ is an organic, preferably aliphatic radical, and R and $R^1$ are as defined above.

It is also possible to use two or more condensation products (K) for the synthesis. In this case it is possible on the one hand to use two or more alcohols and/or two or more carbonates. Furthermore, through the choice of the ratio of the alcohols and the carbonates used, or of the phosgenes used, it is possible to obtain mixtures of different condensates differing in structure. This may be illustrated by way of example using as an example the reaction of a carbonate with a trihydric alcohol. If the starting products are used in a 1:1 ratio, as depicted in (II), then a molecule $XY_2$ is obtained. If the starting products are used in a 2:1 ratio, as depicted in (IV), then a molecule $X_2Y$ is obtained. In the case of a ratio between 1:1 and 2:1 a mixture of molecules $XY_2$ and $X_2Y$ is obtained.

According to the invention, the simple condensates (K) described by way of example in the formulae 1-5 preferentially react intermolecularly to form highly functional polycondensates, hereinafter termed polycondensates (P). The reaction to give the condensate (K) and to give the polycondensate (P) usually takes place at a temperature of from 0 to 250° C., preferably from 60 to 160° C., in bulk or in solution. Use may generally be made here of any of the solvents which are inert with respect to the respective starting materials. Preference is given to use of organic solvents, e.g. decane, dodecane, benzene, toluene, chlorobenzene, xylene, dimethylformamide, dimethylacetamide, or solvent naphtha.

In one preferred embodiment, the condensation reaction is carried out in bulk. The phenol or the monohyric alcohol liberated during the reaction can be removed by distillation from the reaction equilibrium to accelerate the reaction, where appropriate at reduced pressure.

If removal by distillation is intended, it is generally advisable to use those carbonates which liberate alcohols ROH with a boiling point below 140° C. during the reaction.

Catalysts or catalyst mixtures may also be added to accelerate the reaction. Suitable catalysts are compounds which catalyze esterification or transesterification reactions, e.g. alkali metal hydroxides, alkali metal carbonates, alkali metal hydrogencarbonates, preferably of sodium, or potassium, or of cesium, tertiary amines, guanidines, ammonium compounds, phosphonium compounds, organoaluminum, organotin, organozinc, organotitanium, organozirconium, or organobismuth compounds, or else what are known as double metal cyanide (DMC) catalysts, e.g. as described in DE 10138216 or DE 10147712.

It is preferable to use potassium hydroxide, potassium carbonate, potassium hydrogencarbonate, diazabicyclooctane (DABCO), diazabicyclononene (DBN), diazabicyloundecene (DBU), imidazoles, such as imidazole, 1-methylimidazole, or 1,2-dimethylimidazole, titanium tetrabutoxide, titanium tetraisopropoxide, dibutyltin oxide, dibutyltin dilaurate, stannous dioctoate, zirconium acetylacetonate, or mixtures thereof.

The amount of catalyst generally added is from 50 to 10 000 ppm by weight, preferably from 100 to 5000 ppm by weight, based on the amount of the alcohol mixture or alcohol used.

It is also possible to control the intermolecular polycondensation reaction via addition of the suitable catalyst or else via selection of a suitable temperature. The average molecular weight of the polymer (P) may moreover be adjusted by way of the composition of the starting components and by way of the residence time.

The condensates (K) and the polycondensates (P) prepared at an elevated temperature are usually stable at room temperature for a relatively long period.

In the ideal case, the nature of the condensates (K) permits polycondensates (P) with different structures to result from the condensation reaction, these having branching but no crosslinking. Furthermore, the polycondensates (P) have either one carbonate group as focal group and more than two OH groups or else one OH group as focal group and more than two carbonate groups. The number of the reactive groups here is the result of the nature of the condensates (K) used and the degree of polycondensation.

By way of example, a condensate (K) according to the general formula 2 can react via triple intermolecular condensation to give two different polycondensates (P), represented in the general formulae 6 and 7.

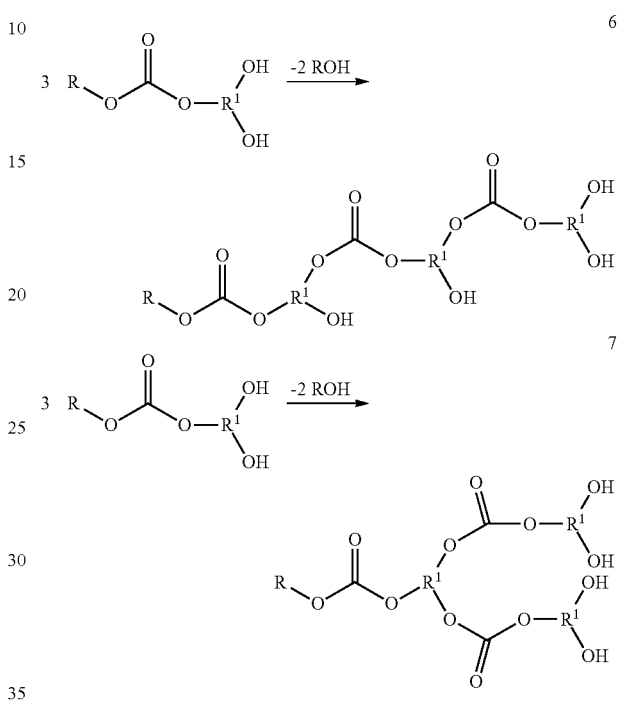

In formula 6 and 7, R and $R^1$ are as defined above.

There are various ways of terminating the intermolecular polycondensation reaction. By way of example, the temperature may be lowered to a range where the reaction stops and the product (K) or the polycondensate (P) is storage-stable.

It is also possible to deactivate the catalyst, by adding Lewis acids or protic acids, for example, in the case of basic catalysts.

In another embodiment, as soon as the intermolecular reaction of the condensate (K) has produced a polycondensate (P) with the desired degree of polycondensation, a product having groups reactive toward the focal group of (P) may be added to the product (P) to terminate the reaction. For example, in the case of a carbonate group as focal group, by way of example, a mono-, di-, or polyamine may be added. In the case of a hydroxy group as focal group, by way of example, a mono-, di-, or polyisocyanate, or a compound containing epoxy groups, or an acid derivative which reacts with OH groups, can be added to the product (P).

The inventive highly functional polycarbonates are mostly prepared in the pressure range from 0.1 mbar to 20 bar, preferably at from 1 mbar to 5 bar, in reactors or reaction cascades which are operated batchwise, semicontinuously, or continuously.

The inventive products can be further processed without further purification after their preparation by virtue of the abovementioned adjustment of the reaction conditions and, where appropriate, by virtue of the selection of the suitable solvent.

In a further preferred embodiment the product is stripped, i.e., freed from volatile compounds of low molecular mass.

For this purpose, after the desired conversion has been reached, the catalyst can be optionally deactivated and the volatile constituents of low molecular mass, e.g. monoalcohols, phenols, carbonates, hydrogen chloride or volatile oligomeric or cyclic compounds, can be removed by distillation, if appropriate with introduction of a gas, preferably nitrogen, carbon dioxide or air, and if appropriate under reduced pressure.

In another preferred embodiment, the inventive polycarbonates may contain other functional groups besides the functional groups present at this stage by virtue of the reaction. This functionalization may take place during the process to increase molecular weight, or else subsequently, i.e. after completion of the actual polycondensation.

If, prior to or during the process to increase molecular weight, components are added which have other functional groups or functional elements besides hydroxy or carbonate groups, the result is a polycarbonate polymer with randomly distributed functionalities other than the carbonate or hydroxy groups.

Effects of this type may, by way of example, be achieved via addition, during the polycondensation, of compounds which bear other functional groups or functional elements, such as mercapto groups, primary, secondary or tertiary amino groups, ether groups, derivatives of carboxylic acids, derivatives of sulfonic acids, derivatives of phosphonic acids, silane groups, siloxane groups, aryl radicals, or long-chain alkyl radicals, besides hydroxy groups, carbonate groups or carbamoyl groups. Examples of compounds which may be used for modification by means of carbamate groups are ethanolamine, propanolamine, isopropanolamine, 2-(butylamino)ethanol, 2-(cyclohexyl-amino)ethanol, 2-amino-1-butanol, 2-(2'-aminoethoxy)ethanol or higher alkoxylation products of ammonia, 4-hydroxypiperidine, 1-hydroxyethylpiperazine, diethanolamine, dipropanolamine, diisopropanolamine, tris(hydroxymethyl)aminomethane, tris(hydroxy-ethyl)aminomethane, ethylenediamine, propylenediamine, hexamethylenediamine or isophoronediamine.

An example of a compound which may be used for modification with mercapto groups is mercaptoethanol. By way of example, tertiary amino groups can be produced via incorporation of N-methyldiethanolamine, N-methyldipropanolamine or N,N-dimethylethanolamine. By way of example, ether groups may be generated via co-condensation of di- or higher-functionality polyetherols. Long-chain alkyl radicals can be introduced via reaction with long-chain alkanediols, and reaction with alkyl or aryl diisocyanates generates polycarbonates having alkyl, aryl, and urethane groups or urea groups.

By adding dicarboxylic acids, tricarboxylic acids, e.g. dimethyl terephthalate, or tricarboxylic esters it is possible to generate ester groups.

Subsequent functionalization can be achieved by using an additional step of the process (step c)) to react the resultant highly functional highly branched, or highly functional hyperbranched polycarbonate with a suitable functionalizing reagent which can react with the OH and/or carbonate groups or carbamoyl groups of the polycarbonate.

By way of example, highly functional highly branched, or highly functional hyperbranched polycarbonates containing hydroxy groups can be modified via addition of molecules containing acid groups or containing isocyanate groups. By way of example, polycarbonates containing acid groups can be obtained via reaction with compounds containing anhydride groups.

Highly functional polycarbonates containing hydroxy groups may moreover also be converted into highly functional polycarbonate polyether polyols via reaction with alkylene oxides, e.g. ethylene oxide, propylene oxide, or butylene oxide.

A great advantage of the process is its cost-effectiveness. Both the reaction to give a condensate (K) or polycondensate (P) and also the reaction of (K) or (P) to give polycarbonates with other functional groups or elements can take place in one reactor, this being advantageous technically and in terms of cost-effectiveness.

The inventive molding compositions may comprise, as component C), from 0 to 60% by weight, in particular up to 50% by weight, of other additives and processing aids, other than B).

The inventive molding compositions may comprise, as component C), from 0 to 5% by weight, preferably from 0.05 to 3% by weight, and in particular from 0.1 to 2% by weight, of at least one ester or amide of saturated or unsaturated aliphatic carboxylic acids having from 10 to 40 carbon atoms, preferably from 16 to 22 carbon atoms, with aliphatic saturated alcohols or amines having from 2 to 40 carbon atoms, preferably from 2 to 6 carbon atoms.

The carboxylic acids may be monobasic or dibasic. Examples which may be mentioned are pelargonic acid, palmitic acid, lauric acid, margaric acid, dodecanedioic acid, behenic acid, and particularly preferably stearic acid, capric acid, and also montanic acid (a mixture of fatty acids having from 30 to 40 carbon atoms).

The aliphatic alcohols may be mono- to tetrahydric. Examples of alcohols are n-butanol, n-octanol, stearyl alcohol, ethylene glycol, propylene glycol, neopentyl glycol, pentaerythritol, preference being given to glycerol and pentaerythritol.

The aliphatic amines may be mono-, di- or triamines. Examples of these are stearylamine, ethylenediamine, propylenediamine, hexamethylenediamine, di(6-aminohexyl)amine, particular preference being given to ethylenediamine and hexamethylenediamine. Correspondingly, preferred esters or amides are glycerol distearate, glycerol tristearate, ethylenediamine distearate, glycerol monopalmitate, glyceryl trilaurate, glyceryl monobehenate, and pentaerythrityl tetrastearate.

It is also possible to use mixtures of various esters or amides, or esters with amides combined, the mixing ratio here being as desired.

Examples of amounts of other usual additives C) are up to 40% by weight, preferably up to 30% by weight, of elastomeric polymers (also often termed impact modifiers, elastomers, or rubbers).

These are very generally copolymers which have preferably been built up from at least two of the following monomers: ethylene, propylene, butadiene, isobutene, isoprene, chloroprene, vinyl acetate, styrene, acrylonitrile and acrylates and/or methacrylates having from 1 to 18 carbon atoms in the alcohol component.

Polymers of this type are described, for example, in Houben-Weyl, Methoden der organischen Chemie, Vol. 14/1 (Georg-Thieme-Verlag, Stuttgart, Germany, 1961), pages 392-406, and in the monograph by C. B. Bucknall, "Toughened Plastics" (Applied Science Publishers, London, 1977).

Some preferred types of such elastomers are described below.

Preferred types of such elastomers are those known as ethylene-propylene (EPM) and ethylene-propylene-diene (EPDM) rubbers.

EPM rubbers generally have practically no residual double bonds, whereas EPDM rubbers may have from 1 to 20 double bonds per 100 carbon atoms.

Examples which may be mentioned of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0$^{2,6}$]-3,8-decadiene, and mixtures of these. Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

EPM and EPDM rubbers may preferably also have been grafted with reactive carboxylic acids or with derivatives of these. Examples of these are acrylic acid, methacrylic acid and derivatives thereof, e.g. glycidyl(meth)acrylate, and also maleic anhydride.

Copolymers of ethylene with acrylic acid and/or methacrylic acid and/or with the esters of these acids are another group of preferred rubbers. The rubbers may also include dicarboxylic acids, such as maleic acid and fumaric acid, or derivatives of these acids, e.g. esters and anhydrides, and/or monomers containing epoxy groups. These monomers containing dicarboxylic acid derivatives or containing epoxy groups are preferably incorporated into the rubber by adding to the monomer mixture monomers containing dicarboxylic acid groups and/or epoxy groups and having the formula I, II, III or IV

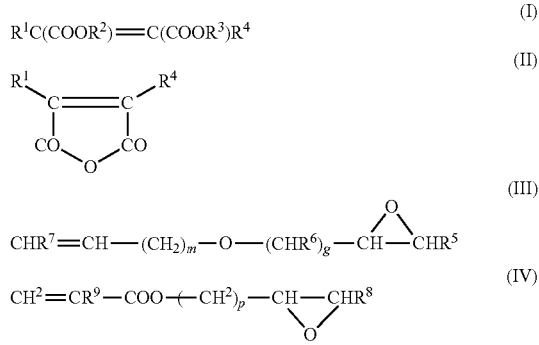

where $R^1$ to $R^9$ are hydrogen or alkyl having from 1 to 6 carbon atoms, and m is a whole number from 0 to 20, g is a whole number from 0 to 10 and p is a whole number from 0 to 5.

$R^1$ to $R^9$ are preferably hydrogen, where m is 0 or 1 and g is 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and (meth)acrylates containing epoxy groups, such as glycidyl acrylate and glycidyl methacrylate, and the esters with tertiary alcohols, such as tert-butyl acrylate. Although the latter have no free carboxy groups, their behavior approximates to that of the free acids and they are therefore termed monomers with latent carboxy groups.

The copolymers are advantageously composed of from 50 to 98% by weight of ethylene, from 0.1 to 20% by weight of monomers containing epoxy groups and/or methacrylic acid and/or monomers containing anhydride groups, the remaining amount being (meth)acrylates.

Particular preference is given to copolymers composed of from 50 to 98% by weight, in particular from 55 to 95% by weight, of ethylene, from 0.1 to 40% by weight, in particular from 0.3 to 20% by weight, of glycidyl acrylate and/or glycidyl methacrylate, (meth)acrylic acid and/or maleic anhydride, and from 1 to 45% by weight, in particular from 10 to 40% by weight, of n-butyl acrylate and/or 2-ethylhexyl acrylate.

Other preferred (meth)acrylates are the methyl, ethyl, propyl, isobutyl and tert-butyl esters.

Besides these, comonomers which may be used are vinyl esters and vinyl ethers.

The ethylene copolymers described above may be prepared by processes known per se, preferably by random copolymerization at high pressure and elevated temperature. Appropriate processes are well known.

Other preferred elastomers are emulsion polymers whose preparation is described, for example, by Blackley in the monograph "Emulsion polymerization". The emulsifiers and catalysts which may be used are known per se.

In principle it is possible to use homogeneously structured elastomers or those with a shell structure. The shell-type structure is determined by the sequence of addition of the individual monomers. The morphology of the polymers is also affected by this sequence of addition.

Monomers which may be mentioned here, merely as examples, for the preparation of the rubber fraction of the elastomers are acrylates, such as n-butyl acrylate and 2-ethylhexyl acrylate, corresponding methacrylates, butadiene and isoprene, and also mixtures of these. These monomers may be copolymerized with other monomers, such as styrene, acrylonitrile, vinyl ethers and with other acrylates or methacrylates, such as methyl methacrylate, methyl acrylate, ethyl acrylate or propyl acrylate.

The soft or rubber phase (with a glass transition temperature of below 0° C.) of the elastomers may be the core, the outer envelope or an intermediate shell (in the case of elastomers whose structure has more than two shells). Elastomers having more than one shell may also have more than one shell made from a rubber phase.

If one or more hard components (with glass transition temperatures above 20° C.) are involved, besides the rubber phase, in the structure of the elastomer, these are generally prepared by polymerizing, as principal monomers, styrene, acrylonitrile, methacrylonitrile, α-methylstyrene, p-methylstyrene, or acrylates or methacrylates, such as methyl acrylate, ethyl acrylate or methyl methacrylate. Besides these, it is also possible to use relatively small proportions of other comonomers.

It has proven advantageous in some cases to use emulsion polymers which have reactive groups at their surfaces. Examples of groups of this type are epoxy, carboxy, latent carboxy, amino and amide groups, and also functional groups which may be introduced by concomitant use of monomers of the formula

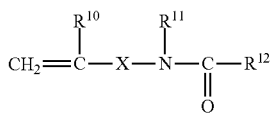

where:
R$^{10}$ is hydrogen or C$_1$-C$_4$-alkyl,
R$^{11}$ is hydrogen or C$_1$-C$_8$-alkyl or aryl, in particular phenyl,
R$^{12}$ is hydrogen, C$_1$-C$_{10}$-alkyl, C$_6$-C$_{12}$-aryl or —OR$^{13}$
R$^{13}$ is C$_1$-C$_8$-alkyl or C$_6$-C$_{12}$-aryl, if desired with substitution by O- or N-containing groups,
X is a chemical bond or C$_1$-C$_{10}$-alkylene or C$_6$-C$_{12}$-arylene, or

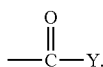

Y is O—Z or NH—Z, and
Z is C$_1$-C$_{10}$-alkylene or C$_6$-C$_{12}$-arylene.

The graft monomers described in EP-A 208 187 are also suitable for introducing reactive groups at the surface.

Other examples which may be mentioned are acrylamide, methacrylamide and substituted acrylates or methacrylates, such as (N-tert-butylamino)ethyl methacrylate, (N,N-dimethylamino)ethyl acrylate, (N,N-dimethylamino)methyl acrylate and (N,N-diethylamino)ethyl acrylate.

The particles of the rubber phase may also have been crosslinked. Examples of crosslinking monomers are 1,3-butadiene, divinylbenzene, diallyl phthalate and dihydrodicyclopentadienyl acrylate, and also the compounds described in EP-A 50 265.

It is also possible to use the monomers known as graft-linking monomers, i.e. monomers having two or more polymerizable double bonds which react at different rates during the polymerization. Preference is given to the use of compounds of this type in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft monomers to form chemical bonds, i.e. the phase grafted on has at least some degree of chemical bonding to the graft base.

Examples of graft-linking monomers of this type are monomers containing allyl groups, in particular allyl esters of ethylenically unsaturated carboxylic acids, for example allyl acrylate, allyl methacrylate, diallyl maleate, diallyl fumarate and diallyl itaconate, and the corresponding monoallyl compounds of these dicarboxylic acids. Besides these there is a wide variety of other suitable graft-linking monomers. For further details reference may be made here, for example, to US-A 4 148 846.

The proportion of these crosslinking monomers in the impact-modifying polymer is generally up to 5% by weight, preferably not more than 3% by weight, based on the impact-modifying polymer.

Some preferred emulsion polymers are listed below. Mention may first be made here of graft polymers with a core and with at least one outer shell, and having the following structure:

| Type | Monomers for the core | Monomers for the envelope |
|------|----------------------|---------------------------|
| I | buta-1,3-diene, isoprene, n-butyl acrylate, ethylhexyl acrylate, or a mixture of these | styrene, acrylonitrile, methyl methacrylate |
| II | as I, but with concomitant use of crosslinking agents | as I |
| III | as I or II | n-butyl acrylate, ethyl acrylate, methyl acrylate, buta-1,3-diene, isoprene, ethylhexyl acrylate |
| IV | as I or II | as I or III, but with concomitant use of monomers having reactive groups, as described herein |
| V | styrene, acrylonitrile, methyl methacrylate, or a mixture of these | first envelope made of monomers as described under I and II for the core, second envelope as described under I or IV for the envelope |

These graft polymers, in particular ABS polymers and/or ASA polymers, are preferably used in amounts of up to 40% by weight for the impact-modification of PBT, if appropriate in a mixture with up to 40% by weight of polyethylene terephthalate. Blend products of this type are obtainable with the trademark Ultradur®S (previously Ultrablend®S from BASF AG).

Instead of graft polymers whose structure has more than one shell, it is also possible to use homogeneous, i.e. single-shell, elastomers made from 1,3-butadiene, isoprene and n-butyl acrylate or from copolymers of these. These products, too, may be prepared by concomitant use of crosslinking monomers or of monomers having reactive groups.

Examples of preferred emulsion polymers are n-butyl acrylate-(meth)acrylic acid copolymers, n-butyl acrylate-glycidyl acrylate or n-butyl acrylate-glycidyl methacrylate copolymers, graft polymers with an inner core made from n-butyl acrylate or based on butadiene and with an outer envelope made from the abovementioned copolymers, and copolymers of ethylene with comonomers which supply reactive groups.

The elastomers described may also be prepared by other conventional processes, e.g. by suspension polymerization.

Preference is also given to silicone rubbers, as described in DE-A 37 25 576, EP-A 235 690, DE-A 38 00 603 and EP-A 319 290.

It is, of course, also possible to use mixtures of the types of rubber listed above.

Fibrous or particulate fillers D) which may be mentioned are carbon fibers, glass fibers, glass beads, amorphous silica, asbestos, calcium silicate, calcium metasilicate, magnesium carbonate, kaolin, chalk, powdered quartz, mica, barium sulfate and feldspar, used in amounts of up to 50% by weight, in particular up to 40% by weight.

Preferred fibrous fillers which may be mentioned are carbon fibers, aramid fibers and potassium titanate fibers, and particular preference is given to glass fibers in the form of E glass. These may be used as rovings or in the commercially available forms of chopped glass.

The fibrous fillers may have been surface-pretreated with a silane compound to improve compatibility with the thermoplastic.

Suitable silane compounds have the formula:

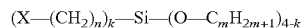

where:
X NH$_2$—,

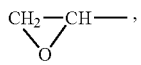

HO—,
n is a whole number from 2 to 10, preferably 3 to 4,
m is a whole number from 1 to 5, preferably 1 to 2, and
k is a whole number from 1 to 3, preferably 1.

Preferred silane compounds are aminopropyltrimethoxysilane, aminobutyltrimethoxysilane, aminopropyltriethoxysilane and aminobutyltriethoxysilane, and also the corresponding silanes which contain a glycidyl group as substituent X.

The amounts of the silane compounds generally used for surface-coating are from 0.05 to 5% by weight, preferably from 0.5 to 1.5% by weight and in particular from 0.8 to 1% by weight (based on C).

Acicular mineral fillers are also suitable.

For the purposes of the invention, acicular mineral fillers are mineral fillers with strongly developed acicular character. An example is acicular wollastonite. The mineral preferably has an L/D (length to diameter) ratio of from 8:1 to 35:1, preferably from 8:1 to 11:1. The mineral filler may, if desired, have been pretreated with the abovementioned silane compounds, but the pretreatment is not essential.

Other fillers which may be mentioned are kaolin, calcined kaolin, wollastonite, talc and chalk.

As component C), the thermoplastic molding compositions of the invention may comprise the usual processing aids, such as stabilizers, oxidation retarders, agents to counteract decomposition due to heat and decomposition due to ultraviolet light, lubricants and mold-release agents, colorants, such as dyes and pigments, nucleating agents, plasticizers, etc.

Examples which may be mentioned of oxidation retarders and heat stabilizers are sterically hindered phenols and/or phosphites, hydroquinones, aromatic secondary amines, such as diphenylamines, various substituted members of these groups, and mixtures of these in concentrations of up to 1% by weight, based on the weight of the thermoplastic molding compositions.

UV stabilizers which may be mentioned, and are generally used in amounts of up to 2% by weight, based on the molding composition, are various substituted resorcinols, salicylates, benzotriazoles, and benzophenones.

Colorants which may be added are inorganic pigments, such as titanium dioxide, ultramarine blue, iron oxide, and carbon black, and also organic pigments, such as phthalocyanines, quinacridones and perylenes, and also dyes, such as nigrosine and anthraquinones.

Nucleating agents which may be used are sodium phenylphosphinate, alumina, silica, and preferably talc.

Other lubricants and mold-release agents are usually used in amounts of up to 1% by weight. Preference is given to long-chain fatty acids (e.g. stearic acid or behenic acid), salts of these (e.g. calcium stearate or zinc stearate) or montan waxes (mixtures of straight-chain saturated carboxylic acids having chain lengths of from 28 to 32 carbon atoms), or calcium montanate or sodium montanate, or low-molecular-weight polyethylene waxes or low-molecular-weight polypropylene waxes.

Examples of plasticizers which may be mentioned are dioctyl phthalates, dibenzyl phthalates, butyl benzyl phthalates, hydrocarbon oils and N-(n-butyl)benzene-sulfonamide.

The inventive molding compositions may also comprise from 0 to 2% by weight of fluorine-containing ethylene polymers. These are polymers of ethylene with a fluorine content of from 55 to 76% by weight, preferably from 70 to 76% by weight.

Examples of these are polytetrafluoroethylene (PTFE), tetrafluoroethylene-hexafluoropropylene copolymers and tetrafluoroethylene copolymers with relatively small proportions (generally up to 50% by weight) of copolymerizable ethylenically unsaturated monomers. These are described, for example, by Schildknecht in "Vinyl and Related Polymers", Wiley-Verlag, 1952, pages 484-494 and by Wall in "Fluoropolymers" (Wiley Interscience, 1972).

These fluorine-containing ethylene polymers have homogeneous distribution in the molding compositions and preferably have a particle size $d_{50}$ (numeric median) in the range from 0.05 to 10 μm, particular from 0.1 to 5 μm. These small particle sizes may particularly preferably be achieved by the use of aqueous dispersions of fluorine-containing ethylene polymers and the incorporation of these into a polyester melt.

The inventive thermoplastic molding compositions may be prepared by methods known per se, by mixing the starting components in conventional mixing apparatus, such as screw extruders, Brabender mixers or Banbury mixers, and then extruding them. The extrudate may be cooled and comminuted. It is also possible to premix individual components and then to add the remaining starting materials individually and/or likewise in a mixture. The mixing temperatures are generally from 230 to 290° C.

In another preferred method of operation, components B) and, if appropriate, C) may be mixed with a polyester prepolymer, compounded, and pelletized. The resultant pellets are then solid-phase-condensed, continuously or batchwise, under an inert gas, at a temperature below the melting point of component A) until the desired viscosity has been reached.

The inventive thermoplastic molding compositions feature good flowability together with good mechanical properties.

In particular, the processing of the molding compositions (without clumping or caking) is problem-free and possible within short cycle times and therefore suitable in particular for thin-walled components (nanomoldings).

These materials are suitable for the production of fibers, films, and moldings of any type, in particular for applications as plugs, switches, housing parts, housing covers, headlamp bezels, shower head, smoothing irons, rotary switches, stove controls, fryer lids, door handles, rear mirror housings, tailgate screen wipers, sheathing for optical conductors (extrusion).

EXAMPLES

Component A/1: Polybutylene terephthalate with a viscosity number VN of 130 ml/g and carboxy end group content of 34 mval/kg (Ultradur® B 4520 from BASF AG) (VN measured in 0.5% strength by weight solution in phenol/o-dichlorobenzene), 1:1 mixture) at 25° C., comprising 0.65% by weight of pentaerythrityl tetrastearate (component C1, based on 100% by weight of A).
Component A/2: Polyethylene terephthalate PET with a VN of 74.5 ml/g
Component A/3: Polytrimethylene terephthalate PTT with a VN of 106 ml/g
Component A/4: Polycarbonate based on bisphenol A and diphenyl carbonate with a VN of 59 ml/g
Component A/5: PBT with VN 130 ml/g, but without component C1

Component A/6
Polybutylene terephthalate with a viscosity number VN of 160 ml/g and a carboxy group content of 28 meq/kg (Ultradur® B 6550 from BASF AG (VN measured in 0.5% strength by weight solution of phenol/o-dichlorobenzene 1:1 mixture) at 25° C.

Component A/7
Polybutylene terephthalate with a viscosity number VN of 107 ml/g and a carboxy group content of 31 meq/kg (Ultradur® B 2550 from BASF AG (VN measured in 0.5% strength by weight solution of phenol/o-dichlorobenzene 1:1 mixture) at 25° C.

Specification for Preparing Polycarbonates B)
General Operating Specification:

The polyhydric alcohol according to table 1 was mixed in equimolar proportions with diethyl carbonate in a three-necked flask equipped with stirrer, reflux condenser, and internal thermometer and 250 ppm of catalyst (based on the amount of alcohol) were added. The mixture was then heated, with stirring, to 100° C., and in the case of the experiment indicated by * heated to 140° C., and stirred at this temperature for 2 h. As the reaction time proceeded, the temperature of the reaction mixture here reduced as evaporative cooling from the liberated monoalcohol began to take effect. The reflux condenser was then replaced by a condenser, ethanol was removed by distillation, and the temperature of the reaction mixture was slowly increased to 160° C.

The ethanol removed by distillation was collected in a cooled round-bottomed flask and weighed, and the conversion was thus determined compared as a percentage with the complete conversion theoretically possible (see table 1).

The reaction products were then analyzed by gel permeation chromatography, the eluent used being dimethylacetamide, and the standard used being polymethyl methacrylate (PMMA).

Component C/2:
Chopped Glass Fibers
Preparation of Molding Compositions

Components A) to C) were blended in a twin-screw extruder at from 250 to 260° C. and extruded into a water bath. After pelletizing and drying, test specimens were injection molded and tested.

MVR was determined to ISO 1133, modulus of elasticity to ISO 527-2, Charpy impact strength to ISO 179-2/1eU.

VN: ISO 1628 in phenol/o-dichlorobenzene 1:1, 25° C., yield strain/tensile strain at break to ISO 527-2.

The inventive compositions and the results of the measurements are found in the tables.

TABLE 1

| Components [% by weight] | 1 | 2 | 3 | 4 | 5 | 6 | 1C | 2C |
|---|---|---|---|---|---|---|---|---|
| A/1 | 97 | | | | | 67 | 70 | 100 |
| A/5 | | 97 | | | | | | |
| A/2 | | | 97 | | | | | |
| A/3 | | | | 97 | | | | |
| A/4 | | | | | 97 | | | |
| B/2 | 3 | 3 | 3 | 3 | 3 | 3 | | |
| C/2 | | | | | | 30 | 30 | |
| VN: | 100 | 98.1 | 64.3 | 90.6 | 45.5 | 80 | 112.4 | 120 |
| MVR | >250 | >250 | >250 | >250 | >250 | 34.4 | 15 | 54.5 |
| Flow spiral 260/80° C. - 2mm (mm) | 81 | 81 | 50 | 92 | 49 | 65 | 24 | 37 |

TABLE 2

| | 1 | 2 | 1C |
|---|---|---|---|
| Components | | | |
| A/1 | 95 | 98 | 100 |
| Mixture (1:1) B/2 + B/3 | 5 | 2 | |

TABLE 1

| Component | Alcohol | Catalyst | Distillate, amount of ethanol, based on complete conversion mol % | Molar mass of product (g/mol) Mw Mn | Visc. of product at 23° C. (mPas) | OH number of product (mg KOH/g) to DIN 53240, Part 2 |
|---|---|---|---|---|---|---|
| B/1 | TMP x 1.2 EO | K₂CO₃ | 70 | 2200 1500 | 3820 | 498 |
| B/2 | TMP x 3 EO | K₂CO₃ | 90 | 4100 2500 | 4020 | 310 |
| B/3 | TMP x 3 EO | K₂CO₃ | 70 | 2900 1850 | 780 | 349 |
| B/4 | TMP x 12 EO | K₂CO₃ | 70 | 4400 2500 | 550 | 180 |
| B/5 | TMP x 12 EO | K₂CO₃ | 90 | 5500 2700 | 990 | 164 |
| B/6 | TMP x 1.2 PO | K₂CO₃ | 90 | 2800 1800 | 37 000 | 436 |
| B/7 | Glyc x 5 EO | K₂CO₃ | 90 | 3900 2700 | 1160 | 295 |
| B/8 | Glyc x 7.5 PO | KOH | 85 | 4200 2600 | 1340 | 225 |

Glyc = glycerol
PO = propylene oxide
TMP = trimethylolpropane
DEC = diethylcarbonate
EO = ethylene oxide TABLE 2-continued

|  | 1 | 2 | 1C |
|---|---|---|---|
| Mechanical properties | | | |
| Stress at max.: (N/mm) | 33.8 | 56.2 | 56.2 |
| Tensile strain at yield (%) | 1.8 | 5.9 | 3.5 |
| Modulus of elasticity: | 2532 | 2403 | 2488 |
| Impact strength - notched (kJ/m$^2$) | 3 | 3.5 | 4.3 |
| Flow spiral 260/80° C. −2 mm (cm) | >150 | 71 | 35 |

TABLE 3

|  | 1C | 1 | 2 | 3 | 4 | 2C | 5 | 6 | 7 |
|---|---|---|---|---|---|---|---|---|---|
| Components | | | | | | | | | |
| A/5 | 100 | 95 | 97 | 99 | 67 | | | | |
| A/6 | | | | | | 100 | 99 | 97 | 67 |
| B/2 | | 5 | 3 | 1 | 3 | | 1 | 3 | 3 |
| C/2 | | | | | 30 | | | | 30 |
| MVR | 26.4 | >250 | >250 | 47.6 | 118 | 108 | 191 | >250 | 149 |
| Mechanical properties | | | | | | | | | |
| Stress at max.: (N/mm) | 56.7 | 36.6 | 55.9 | 58.5 | 133.8 | 58.5 | 53.9 | 45.6 | 130.6 |
| Tensile strain at yield (%) | 13.5 | 1.7 | 3.3 | 8.8 | 2.2 | 5.3 | 4.4 | 2.1 | 2.1 |
| Modulus of elasticity: (N/mm) | 2554 | 2219 | 2472 | 2651 | 9481 | 2572 | 2610 | 2383 | 9691 |
| Flow spiral 260/80° C. - 2 mm (mm) | 26 | 107 | 77 | 37 | 55 | 46 | 62 | 97 | 60 |

TABLE 4

|  | 1 | 2 | 3 | 4 | 5 | 6 | 7 | 8 | 9 |
|---|---|---|---|---|---|---|---|---|---|
| Components | | | | | | | | | |
| A/1 | 99 | 98 | 96 | 99 | 98 | 96 | 99 | 98 | 96 |
| B1 | 1.00 | 2.00 | 4.00 | | | | | | |
| B7 | | | | 1.00 | 2.00 | 4.00 | | | |
| B6 | | | | | | | 1.00 | 2.00 | 4.00 |
| MVR | 105 | 210 | >250 | 117 | 180 | >250 | 144 | >250 | >250 |
| Mechanical properties | | | | | | | | | |
| Stress at max.: (N/mm) | 57.7 | 58.4 | 11.58 | 55.5 | 53.6 | 46.9 | 56.7 | 56.2 | 38.9 |
| Tensile strain at yield (%) | 3.8 | 3.9 | 0.5 | 3.9 | 9.2 | 3.3 | 3.8 | 3.4 | 2.1 |
| Modulus of elasticity: (N/mm) | 2532 | 2510 | 2108 | 2396 | 2206 | 2020 | 2441 | 2391 | 2072 |
| Flow spiral 260/80° C. - 2 mm (mm) | 52 | 71 | 128 | 54 | 70 | 98 | 61 | 88 | 126 |

TABLE 5

|  | 1 | 2 | 3 | 4 | 5 | 6 | 7 | 8 | 9 |
|---|---|---|---|---|---|---|---|---|---|
| Components | | | | | | | | | |
| A/1 | 99 | 98 | 96 | 99 | 98 | 96 | 99 | 98 | 96 |
| B8 | 1 | 2.00 | 4 | | | | | | |
| B5 | | | | 1.00 | 2.00 | 4.00 | | | |
| B4 | | | | | | | 1.00 | 2.00 | 4.00 |
| MVR | 76 | 81 | 102 | 71 | 90 | 157 | 77 | 95 | 162 |

TABLE 5-continued

|  | 1 | 2 | 3 | 4 | 5 | 6 | 7 | 8 | 9 |
|---|---|---|---|---|---|---|---|---|---|
| Mechanical properties | | | | | | | | | |
| Stress at max: (N/mm) | 54.7 | 52.5 | 48.2 | 53.7 | 52 | 48.4 | 53.6 | 51.3 | 51.6 |
| Tensile strain at yield (%) | 3.8 | 8.9 | 11.2 | 3.9 | 10.5 | 11.7 | 8.2 | 10.8 | 11 |
| Modulus of elasticity: (N/mm) | 2370 | 2199 | 1874 | 2317 | 2149 | 1771 | 2306 | 2099 | 2048 |
| Flow spiral 260/80° C. - 2 mm (mm) | 46 | 49 | 60 | 44 | 49 | 68 | 46 | 53 | 68 |

What is claimed is:

1. A thermoplastic molding composition comprising:
   A) from 10 to 99.99% by weight of at least one thermoplastic polyester;
   B) from 0.01 to 20% by weight of a hyperbranched polycarbonate having an OH number of from 1 to 600 mg KOH/g of polycarbonate (DIN 53240, Part 2), a degree of branching from 10 to 99.9%, and both structural and molecular non-uniformity;
   C) from 0 to 60% by weight of other additives;
   wherein the total of the percentages by weight of components A) to C) is 100%, wherein component B) has a glass transition temperature Tg of from −80° C. to 140° C.

2. The thermoplastic molding composition according to claim 1, wherein component B) has a number-average molar mass Mn of from 100 to 15 000 g/mol.

3. The thermoplastic molding composition according to claim 1, wherein component B) has a viscosity (mPas) at 23° C. (DIN 53019) of from 50 to 200 000.

4. The thermoplastic molding composition according to claim 1, wherein B) has an OH number of from 10 to 550 mg KOH/g.

5. The thermoplastic molding composition according to claim 1, wherein B) has an OH number of from 50 to 550 mg KOH/g.

6. The thermoplastic molding composition according to claim 1, wherein the degree of branching of B) is from 20 to 99%.

7. The thermoplastic molding composition according to claim 1, wherein the degree of branching of B) is from 20 to 95%.

8. The thermoplastic molding composition according to claim 1, wherein the amount of B) is from 0.1 to 10% by weight.

9. The thermoplastic molding composition according to claim 1, wherein component B) is obtainable via a process comprising:
   reacting at least one organic carbonate (A) of the general formula RO[(CO)]nOR with at least one aliphatic, aliphatic/aromatic or aromatic alcohol (B) which has at least 3 OH groups, with elimination of alcohols ROH to give one or more condensates (K), where each R, independently of the others, is a straight-chain or branched aliphatic, aromatic/aliphatic or aromatic hydrocarbon radical having from 1 to 20 carbon atoms, and where the radicals R may also be connected to one another to form a ring, and n is an integer between 1 and 5, or
   ab) reacting phosgene, diphosgene or triphosgene with abovementioned alcohol (B), with elimination of hydrogen chloride, and
   intermolecular reaction of the condensates (K) to give a highly functional, highly branched, or highly functional, hyperbranched polycarbonate,
   where the quantitative proportion of the OH groups to the carbonates in the reaction mixture is selected in such a way that the condensates (K) have an average of either one carbonate group and more than one OH group or one OH group and more than one carbonate group.

10. The thermoplastic molding composition according to claim 9, wherein the reaction mixture further comprises at least one alcohol (B') having two OH groups, with the proviso that the average total OH functionality of all of the alcohols used is greater than 2.

11. The thermoplastic molding composition according to claim 9, where the resultant highly functional, highly branched, or highly functional, hyperbranched polycarbonate is reacted, in an additional step (step c)), with a suitable functionalizing reagent which can react with the OH and/or carbonate groups of the polycarbonate.

12. The thermoplastic molding composition according to claim 9, where the highly functional, highly branched, or highly functional, hyperbranched polycarbonate is modified by carrying out step b) in the presence of additional compounds which have not only OH groups or carbonate groups but also other functional groups or functional elements.

13. A method of producing fibers, films, or moldings comprising utilizing the thermoplastic molding composition according to claim 1.

14. A fiber, a film, or a molding obtainable from the thermoplastic molding compositions according to claim 1.

* * * * *